Figure 1:
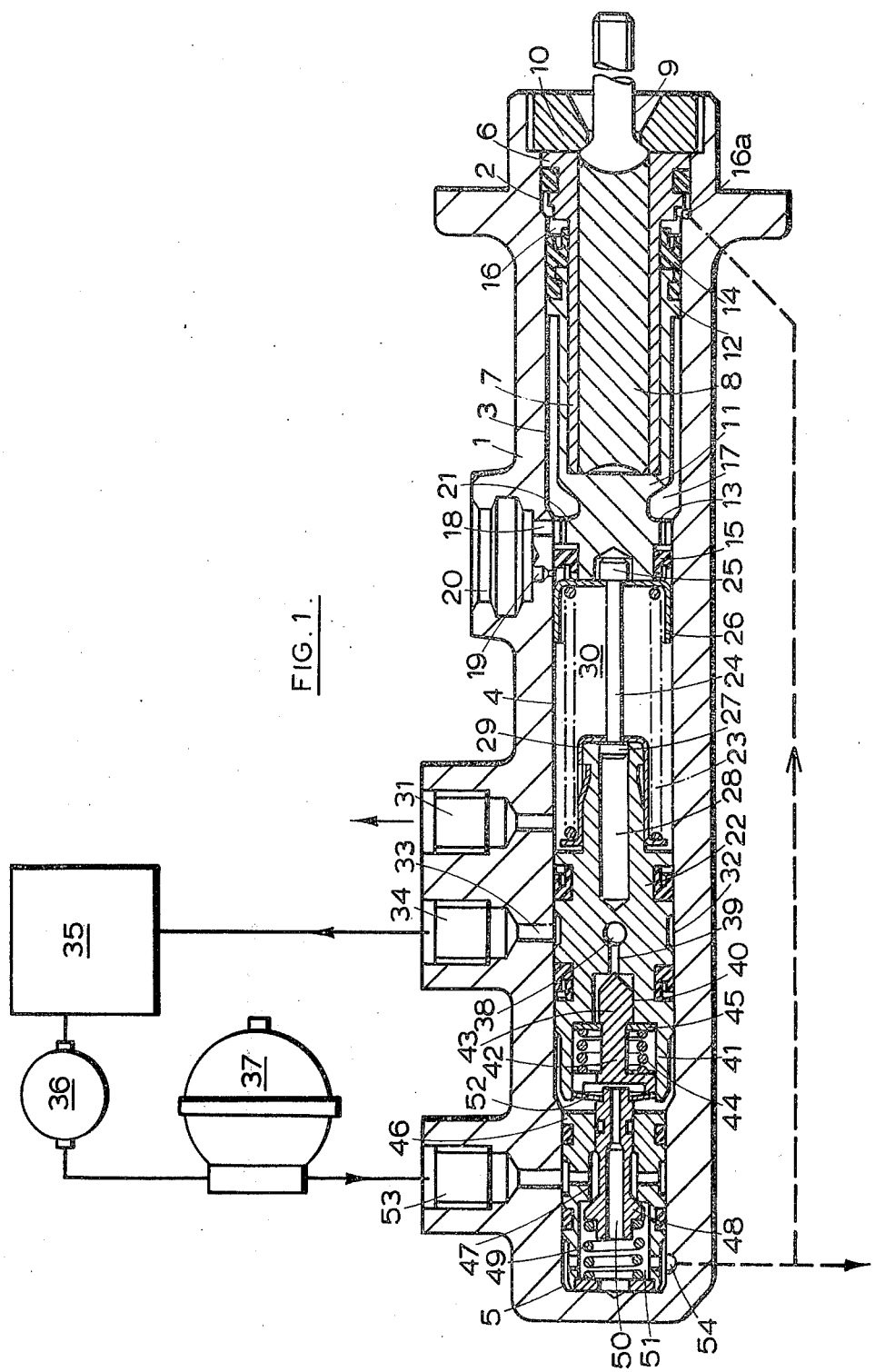

United States Patent [19]
Farr

[11] 3,928,970
[45] Dec. 30, 1975

[54] POWER ASSISTED MASTER CYLINDER ASSEMBLIES

[75] Inventor: Glyn Phillip Reginald Farr, Kenilworth, England

[73] Assignee: Girling Limited, Birmingham, England

[22] Filed: Nov. 28, 1973

[21] Appl. No.: 419,627

[30] Foreign Application Priority Data
Feb. 20, 1973  United Kingdom................. 8177/73
Nov. 30, 1972  United Kingdom............... 55397/72
Dec. 1, 1972   United Kingdom............... 55567/72

[52] U.S. Cl. .................... 60/562; 60/552; 188/359
[51] Int. Cl.² ........................................ B60T 11/20
[58] Field of Search ............ 60/534, 535, 545, 547, 60/552, 555, 549, 560, 561, 562, 566; 188/358, 359

[56] References Cited
UNITED STATES PATENTS

| | | | |
|---|---|---|---|
| 2,410,269 | 10/1946 | Chowings............................ | 60/553 |
| 2,569,028 | 9/1951 | Stryker ................................ | 60/566 |
| 2,616,641 | 11/1952 | Gagen.................................. | 60/547 |
| 2,662,377 | 12/1953 | Miller .................................. | 60/566 |
| 3,319,421 | 5/1967 | Kawabe ............................... | 60/552 |
| 3,683,619 | 8/1972 | Belart .................................. | 60/549 |
| 3,789,611 | 2/1974 | Marquardt.......................... | 188/359 |
| 3,798,905 | 3/1974 | Tennis ................................. | 60/555 |

*Primary Examiner*—Martin P. Schwadron
*Assistant Examiner*—H. Burks, Sr.
*Attorney, Agent, or Firm*—Scrivener Parker Scrivener and Clarke

[57] ABSTRACT

A power-assisted master cylinder includes a pedal operated piston for pressurising a pressure space connected to a brake circuit, and a second piston for operating valve means controlling the fluid assisting the pedal, movement of the first piston being transmitted to the second piston either hydraulically or mechanically. One end of the second piston is exposed to the pressure in the pressure space and the other end is exposed to the pressure of the assisting fluid whereby the valve means automatically meters the assisting fluid.

18 Claims, 4 Drawing Figures

POWER ASSISTED MASTER CYLINDER ASSEMBLIES

SPECIFIC DESCRIPTION

This invention relates to power-assisted master cylinder assemblies of the kind comprising a piston movable in a cylinder bore, a pressure space ahead of the piston having an outlet for connection to a brake circuit, a power chamber behind the piston having an inlet for connection to a source of fluid under pressure, and a control valve assembly for controlling the supply of fluid from the pressure source to the power chamber.

Known assemblies of this kind are of two main types. In the first type a pedal-operated member operates the control valve assembly to allow pressure to act on the piston and the same pressure acting on the pedal-operated member gives the driver of the vehicle the familiar "feel" to the brake pedal. However the movement of the pedal will not be transmitted directly to the piston except in the event of a pressure failure when the pedal-operated member is usually arranged to follow through to engage the piston.

In the second known type of assembly a pedal-operated member applies the piston directly and also operates the control valve assembly to allow pressure to act on itself and augment the foot loading. The driver has "feel" but the valve assembly has to move with the piston and to avoid a complicated sealing arrangement for the pressure supply, usually the inlet to the power chamber is made movable.

Thus it is the object of this invention to provide a power-assisted master cylinder assembly of the kind set forth in which the piston is pedal operated but which does not require a movable inlet or inlet seals which move under pressure.

According to the present invention in a master cylinder assembly of the kind set forth the piston is pedal-operated and movement of the piston is transmitted to a second piston which is adapted to operate the control valve assembly.

Movement of the first piston may be transmitted to the second piston by hydraulic pressure. The second piston may work in a second cylinder bore remote from the first cylinder bore.

In assemblies where the first and second pistons are arranged in tandem they may be separated by a spring which is compressed when the pedal is operated to move the second piston. The two pistons may be coupled by a lost motion linkage.

Since the first piston and the pressure space are between the pedal and the control valve assembly, the master cylinder assembly of this invention has the advantage that the control valve assembly is substantially static and the connection from the control valve assembly to the power chamber is also static. This connection may be a passage in a body part of the master cylinder assembly housing the cylinder bore or it may be external of this body part.

The control valve assembly may control a supply of hydraulic fluid under pressure. In this construction a pedal-operated member may move through a sleeve to act on the first piston which is slidable on the sleeve, the hydraulic fluid in the power chamber outside the sleeve acting on the area of the piston outside the sleeve.

As in our British Patent Application No. 44621/71 the control valve assembly may comprise a passage in the second piston providing communication between an outlet port and a reservoir port, the passage being controlled by a normally open exhaust valve member acting through a resilient connection on a normally closed inlet valve member controlling communication between an inlet port and the outlet port, axial movement of the second piston effecting crosing of the exhaust valve member followed by opening of the inlet valve member.

Alternatively the control valve assembly may control a supply of air under pressure. In this construction a pedal-operated member may move through a sleeve to act on the first piston which is movable relative to the sleeve, air in the power chamber acting on a diaphragm secured to the sleeve.

The control valve assembly may comprise a diaphragm movable by the second piston, a passage through the diaphragm providing communication between an outlet port and atmosphere, an exhaust and inlet valve member controlling the passage and communication between an inlet port and the outlet port, axial movement of the second piston moving the diaphragm to close the exhaust valve and moving the valve member to open the inlet valve and the differential forces across the diaphragm metering air under pressure to the power chamber.

In a preferred embodiment of the invention the master cylinder assembly comprises a body in which the first and second pistons are arranged in tandem, a second pressure space ahead of the second piston having a second outlet for connecting the high pressure source to a second brake circuit.

Several embodiments of this invention are illustrated as examples in the accompanying drawings in which FIGS. 1-4 are longitudinal sections through four embodiments of power assisted master cylinder assemblies.

In the master cylinder assembly shown in FIG. 1 a cylinder body 1 is formed with a blind, stepped bore having four portions 2, 3, 4 and 5 of progressively decreasing diameter. In the bore portion 2 of largest diameter is sealed by seal 6a a radial flange 6 on a sleeve 7 which surrounds a rod 8 engaged by a pedal-operated link 9. An annular bush 10 is screwed into the open end of the stepped bore and is in abutment with flange 6.

A stepped-piston 11, the first piston, works in bore portions 3 and 4. The piston 11 is supported in the bore portions 3 and 4 by radial flanges 12 and 13 which are set in from each end and which retain seals 14 and 15 on the piston. An axial recess in the piston 11 receives the pedal rod 8 and its surrounding sleeve 7, the seal 14 being extended from the end of piston 11 to make a seal with sleeve 7. The annular space 16 between seal 14 and flange 6 forms a power chamber having an inlet 16a.

The space 17 between flanges 12 and 13 is maintained at atmospheric pressure by passages 18 and 19 in the cylinder body leading to a reservoir port 20. Passages 21 through flange 13 form a one-way valve with seal 15 to allow fluid flow on the return stroke of piston 11.

Ahead of piston 11 in bore portion 4 works a second piston 22 urged away from piston 11 by a spring 23 but linked to piston 11 by a lost motion coupling comprising a pin 24 having a head at each end, one head 25 trapped in a recess in piston 11 by spring retaining plate 26 and the other head 27 trapped in a recess 28 in piston 22 by cage 29. The axial length of recess 28 is substantially longer than head 27. The space 30 between the first and second pistons forms a first hydrostatic pressure space which is adapted to be connected to a first brake circuit through outlet port 31. Seal 15 co-operates with passage 19 to form a valve controlling communication between pressure space 30 and reservoir port 20.

Ahead of recess 28 piston 22 is formed with a circumferential groove 32 registering with a passage 33 in the cylinder body leading to a port 34 adapted to be connected to a reservoir 35 for a pump 36 which charges an accumulator 37. A radial passage 38 in piston 22 connects groove 32 with an axial passage 39 which opens into a valve recess 40 which in turn opens in to a spring recess 41 at the forward end of the piston. An exhaust valve member 42 has a head 43 trapped in valve recess 40 and co-operating with the forward end of passage 39 which acts as a valve seating. A return spring 44 acts between annular plate 45 abutting the step between recesses 40 and 41 and the forward end of valve member 42.

Ahead of the second piston 22 in the bore portion 5 is sealed an annular seating member 46 incorporating a valve seating 47. An inlet valve member 48 carries a head which is urged by spring 49 into engagement with seating 47. The inlet valve member 48 extends axially through the seating 47 for sealing engagement with the seating member 46 and has a longitudinal bore 50 connecting a second pressure space 51 with the exhaust valve. The end portion of valve member 48 extending into bore portion 4 is connected to the second piston 22 by a Belleville washer 52. The inlet side of seating 47 is connected to an inlet port 53 by radial and circumferential passages in the seating member 46. Inlet port 53 is adapted to be connected to accumulator 37. An outlet 54 from pressure space 51 is adapted to be connected to a second brake circuit. Outlet 54 is connected to the power chamber 16 by a passage (not shown) through the cylinder body 1.

In operation when the brake pedal is depressed movement of the first piston 11 is transmitted to the second piston 22 by hydraulic pressure and by the caged return spring 23. Movement of the second piston brings the end of passage 39 into seating engagement with exhaust valve member 42 to close the exhaust valve, cutting off communication between the second pressure space 51 and reservoir 35. Further movement of the second piston 22 is transmitted to inlet valve member 48 via Belleville washer 52 to allow pressure fluid into pressure space 51 from where it flows through outlet 54 to pressurise the second brake circuit and the pressure chamber 16. With power assistance, the first piston 11 closes the reservoir connection and delivers pressure fluid from the first pressure space 30 to the first brake circuit.

When a pressure balance is achieved and the fluid pressures in the first and second pressure spaces are the same, the load applied to the pedal equals the fluid pressure acting over the differential area of piston 11. It will be noted that fluid in the power chamber 16 does not act to oppose the load on the pedal. At the pressure balance point the valve member 48 closes under the action of spring 49 overcoming the stress in Belleville washer 52. If the pedal load is reduced the pressure in the first pressure space drops and the second piston moves rearwardly to open the exhaust valve and restore the pressure balance. Thus the driver of the vehicle continuously feels a pedal reaction proportional to the braking effort.

In the event of a failure in the first hydrostatic brake circuit, the second piston can be moved by engagement of the two pistons through pin 24 to operate the power circuit. The pedal reaction in this case equals the fluid pressure multiplied by the difference in area between the second piston and the end of the first piston in the power chamber. In the event of the power circuit failing then the first pressure space operates as a normal hydrostatic master cylinder.

Figure 2:
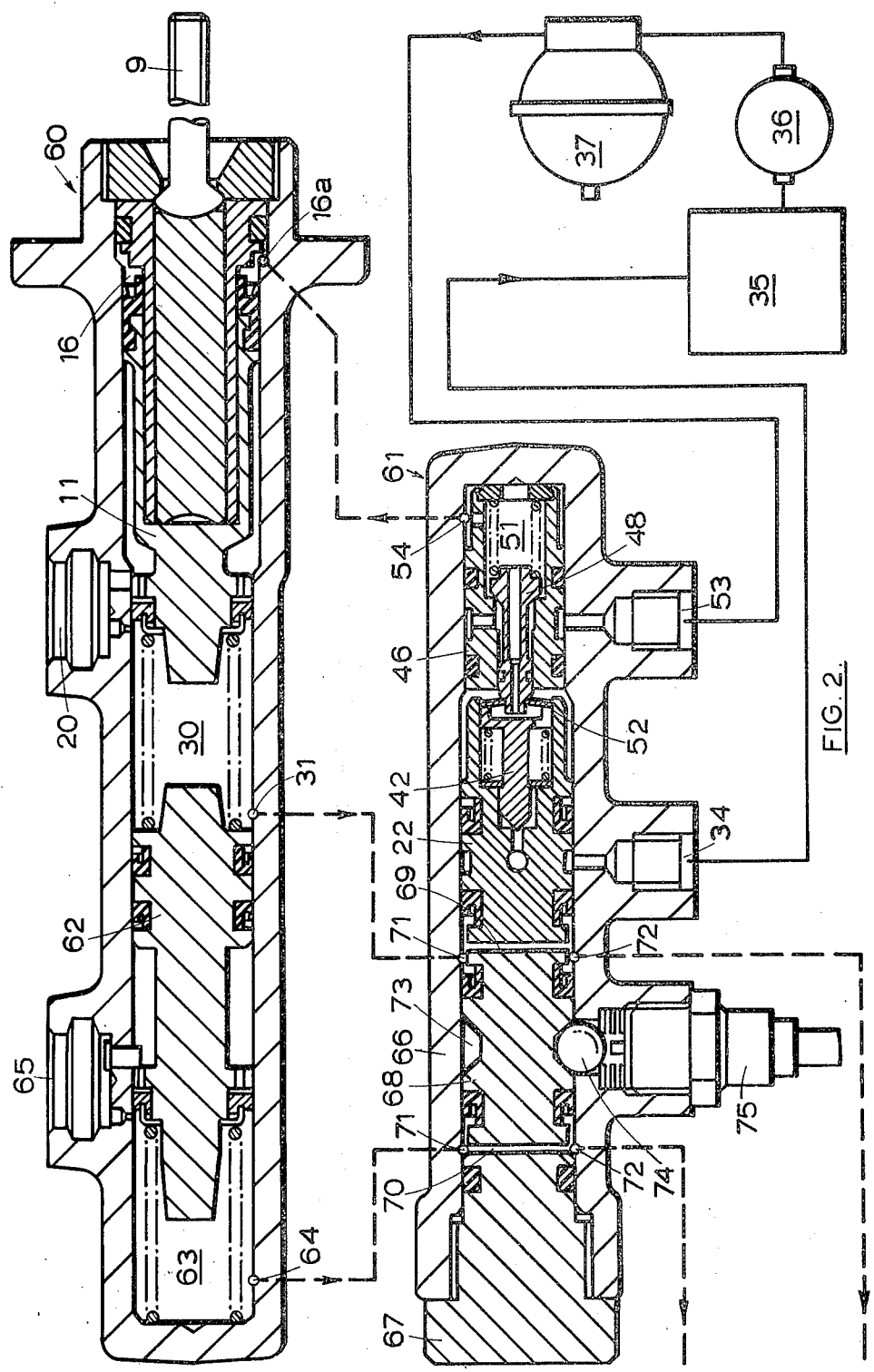

FIG. 2 shows a second embodiment of a master cylinder assembly comprising a tandem hydrostatic master cylinder 60 and a control valve assembly 61. Features having equivalents in FIG. 1 have been given the same reference numerals. The master cylinder now has a floating secondary piston 62, a secondary hydrostatic pressure space 63, a secondary outlet 64 for connection to a second brake circuit and a further reservoir return port 65. The master cylinder and the control valve assembly can be incorporated in a single side-by-side unit though as shown they are separate units connected by external hoses.

The body 66 of control valve assembly 61 also has a blind bore, the open end of which is closed by a plug 67. At the blind end of the bore is located the inlet valve 48 controlling the flow of fluid from inlet port 53 to outlet 54 connected to the power chamber 16, and the exhaust valve 42 controlling communication between the outlet and exhaust port 34. The inlet and exhaust valves are actuated by the second piston 22.

A spool 68 is located between the second piston 22 and plug 67, a first balance chamber 69 being defined between the piston and the spool and a second balance chamber 70 being defined between the spool and the plug. Each chamber has an inlet 71 connected to the corresponding pressure space in the master cylinder, and an outlet 72 for connection to a separate brake circuit. An intermediate peripheral groove 73 in the spool 68 locates a ball 74 which is moved outwardly on axial movement of the spool to operate a switch 75 of a warning circuit. Spool 68 is self-centering.

In operation, when the brake pedal is depressed hydraulic fluid in pressure spaces 30 and 63 is delivered by way of chambers 69 and 70 to two separate brake circuits. Pressure in either of chambers 69, 70 causes movement of control piston 22 to allow pressure fluid from accumulator 37 into power chamber 16 to boost the output from spaces 30 and 63.

If there is a failure in the primary brake circuit, then the primary piston 11 picks up the secondary piston 62 to supply fluid to chamber 70 in the control valve assembly. Spool 68 moves to the right to pick up piston 22. The movement of spool 68 operates switch 75 to light a lamp or other warning device.

If the secondary brake circuit fails, the secondary piston 62 must engage the end of the master cylinder before pressure is generated in space 30 and chamber 69. This pressure moves spool 68 to the left and piston 22 to the right, operating the pressure differential warning and the valve mechanism.

Figure 3:
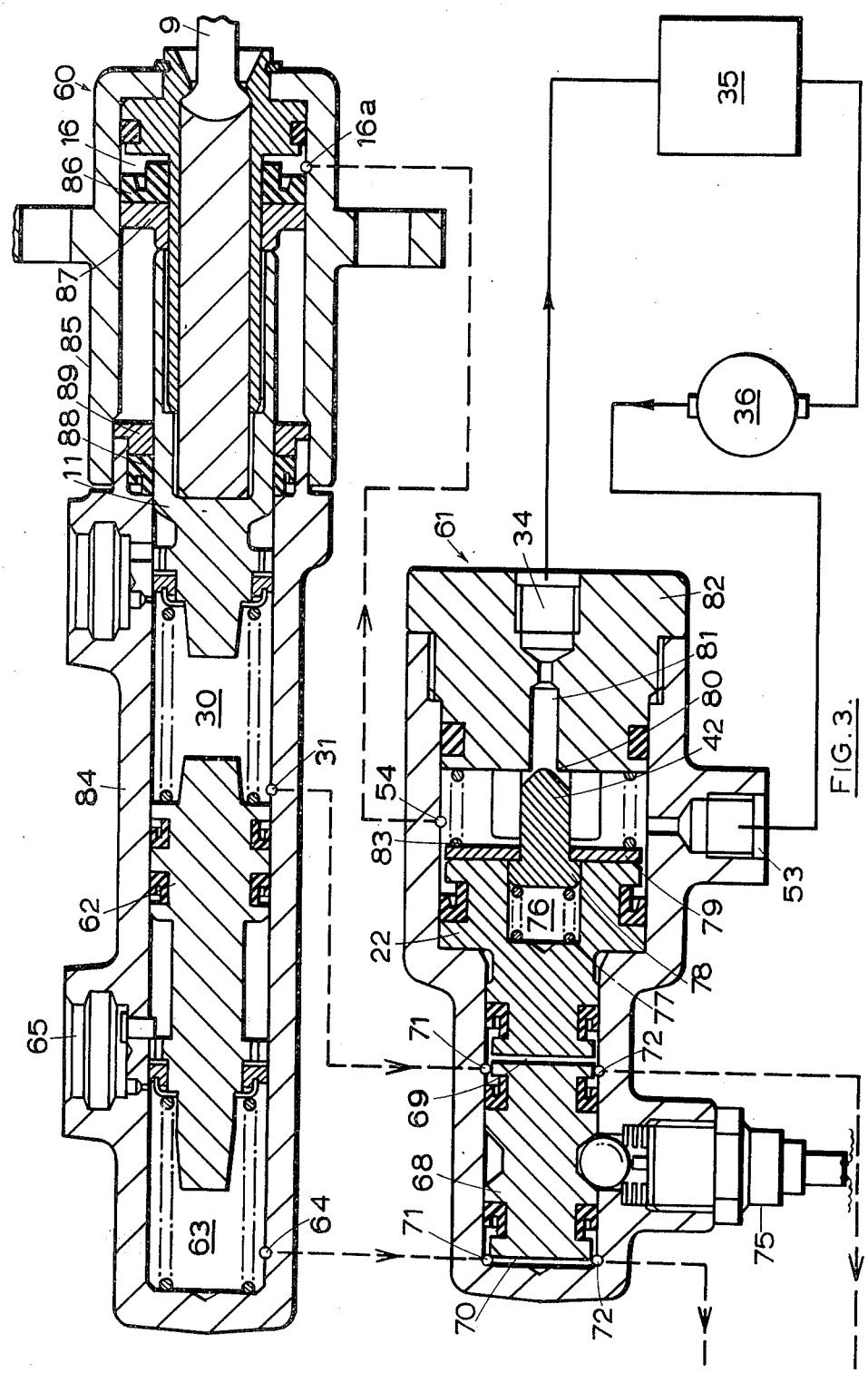

The master cylinder assembly of FIG. 3 is similar to that of FIG. 2 and equivalent parts have been given the same reference numerals. However the control valve assembly 61 has been modified for use with an open centre power supply in which pump 36 continuously pumps fluid through inlet port 53 and pressure space 51 to reservoir 35 via exhaust port 34. In this arrangement only the exhaust valve 42 is required to shut off the reservoir return and allow pressure to bluid up. Control piston 22 is stepped and has a recess 76 in its wider diameter end housing a spring 77 which urges a headed end 78 of valve member 42 into abutment with a retaining plate 79. The valve member 42 co-operates with a seating 80 at the end of an axial passage 81 in an end plug 82 containing exhaust port 34. Plate 79 is held against piston 22 by a spring 83 acting between plate 79 and plug 82.

The master cylinder of FIG. 3 has also been modified slightly by making it in two parts, a forward part 84 containing both pressure spaces and a rear part 85 of greater diameter housing the power chamber 16. The piston 11 has also been formed in two parts, the rearmost seal 86 being supported by a separate ring 87 abutting the end of the piston. The forward seal 88 is held stationary between the step at the change of bore diameter and a ring 89 fixed between the two cylinder parts 84 and 85.

The assembly of FIG. 3 operates in the same way as that of FIG. 2.

Figure 4:
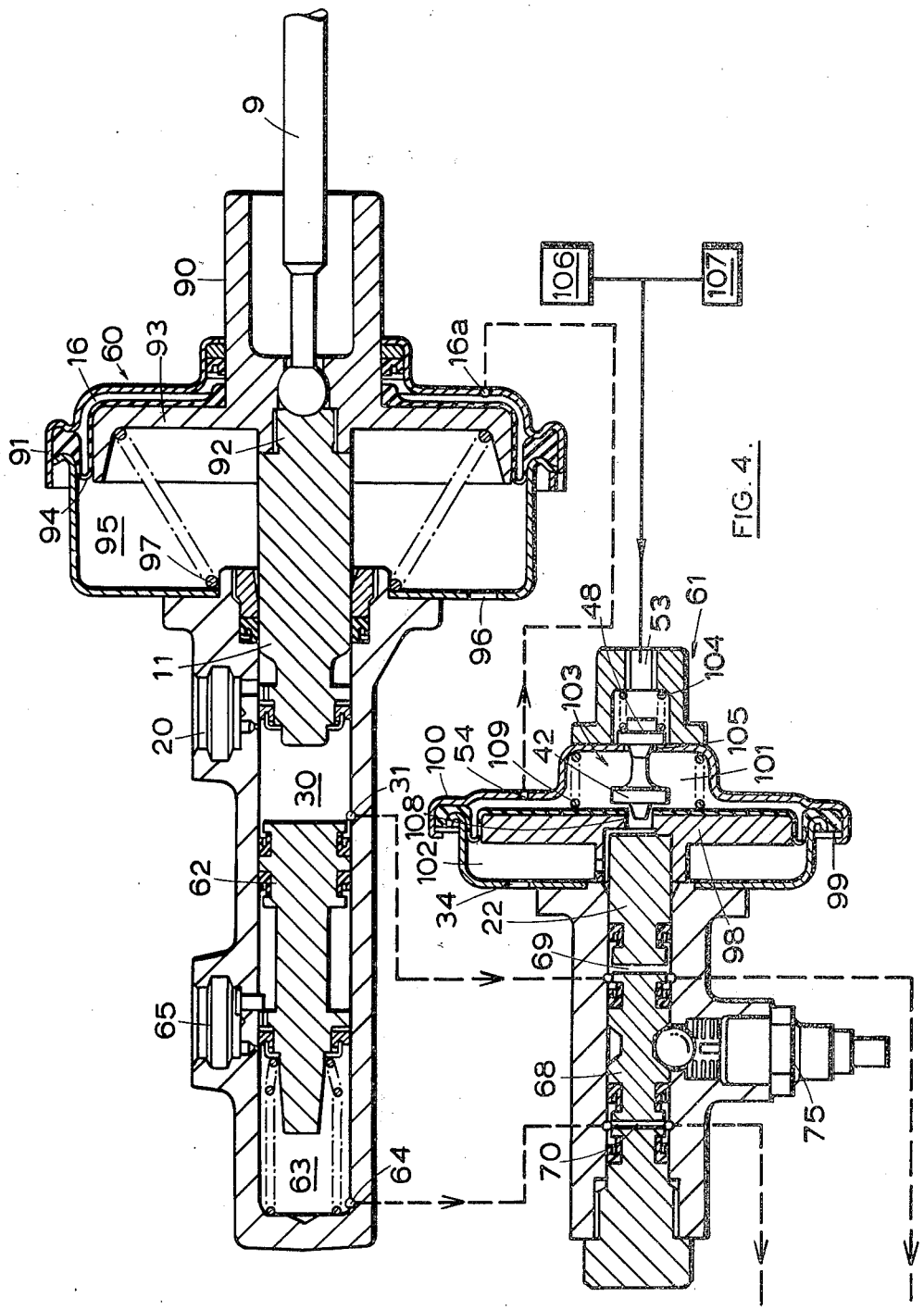

In FIG. 4 the master cylinder assembly of FIG. 2 has been modified for use with compressed air. Again the same reference numerals have been used for equivalent parts. It will be seen that the power chamber 16 of the master cylinder is the high pressure chamber of an air-suspended diaphragm booster. The pedal-operated rod 9 acts through a sleeve 90 sealingly engaging the edge of an opening in a booster housing 91. The end of the rod 9 engages an axial extension 92 of the primary piston 11 which is secured to the sleeve. Inside the housing 91 the sleeve 90 has a radial extension 93 which carries a flexible diaphragm 94 dividing the housing into the power chamber 16 and a low pressure chamber 95 having an exhaust port 96. A spring 97 biases the sleeve to the "off" position.

In the control valve assembly 61 the piston 22 acts on and is guided in a seating member 98 carrying a diaphragm 99 dividing the valve housing 100 into a high pressure chamber 101 and a low pressure chamber 102. The inlet valve 48 and exhaust valve 42 are formed as the two headed ends of a single valve member 103. The inlet valve 48 is loaded by a spring 104 into engagement with a seating surrounding an opening 105 into the high pressure chamber, the valve member extending through the opening 105 and the inlet port 53 being connected to a pressure vessel 106 and air compressor 107. The exhaust valve 42 co-operates with a seating surrounding a passage 108 through the seating member 98 which is biassed away from the valve member 103 by a spring 109.

In operation when the brake pedal is depressed hydraulic fluid in the pressure spaces 30 and 63 is delivered by way of chambers 69 and 70 to two separable brake circuits. Pressure in either of spaces 69, 70 causes control piston 22 to move the seating member 98 to the right to close the exhaust valve 42 and open inlet valve 48. Air from vessel 106 is admitted to the power chamber 16 via ports 53, 54, 16a to boost the pedal effort applied to the piston 11. When the brake pedal is released, inlet valve 48 shuts and exhaust valve 42 opens venting the high pressure chamber 101 and power chamber 16 to atmosphere through exhaust port 34.

The master cylinder assemblies described are intended for use in L split braking systems i.e., systems in which each of two braking circuits operates an actuator on each front wheel and one rear wheel, each front wheel brake having two separate actuators. Should either of the brake circuits fail the system will allow 50% of normal braking for a given pedal effort. Should the power supply fail, then assuming a 3:1 boost ratio, the system will allow 100/3 or 33⅓ percent of normal braking for a given pedal effort.

I claim:

1. A power assisted master cylinder assembly comprising a master cylinder which includes a body provided with a bore having inner and outer ends, a first piston moveable in said bore and having inner and outer portions, said inner portion bounding a pressure space inward of said piston for connection to a brake circuit, the outer portion of said piston being formed with an inwardly extending axial bore, a fixed sleeve slideably received in said bore, a pedal operated member extending through said fixed sleeve to directly engage said first piston, an annular closure member for closing the outer end of an annular space defined between said sleeve and said bore, first seal means between said piston outer portion, said sleeve and said bore, second seal means for sealing said closure member to said bore and said sleeve, said first and second seal means, said sleeve and said bore defining a sealed annular power chamber, an inlet to said power chamber for connection to a source of fluid under pressure and a control valve assembly which includes valve means for controlling the supply of fluid from said source to said power chamber, a second piston to operate said valve means, and means for transmitting movement of said first piston to said second piston; said pedal-operated member and pressure fluid in said power chamber acting in parallel on said first piston to prevent kick-back on said pedal-operated member on a rapid increase in pressure in said power chamber.

2. A power-assisted master cylinder assembly as in claim 1 wherein one end of said second piston is exposed to fluid pressure in said pressure space and the other end of said second piston is exposed to fluid pressure in said power chamber whereby the control valve assembly meters fluid from said pressure source to said power chamber.

3. A power-assisted master cylinder assembly as in claim 2 wherein said master cylinder is a unit separate from said control valve assembly but connected to it by fluid connections.

4. A power-assisted master cylinder assembly as in claim 3 wherein said control valve assembly is connected to said master assembly by external hoses.

5. A power-assisted master cylinder assembly as in claim 2 wherein said first and second pistons are arranged in tandem in said body, a second pressure space being defined ahead of said second piston and means being provided for connecting said second pressure space to said power chamber.

6. A power-assisted master cylinder assembly as in claim 2 wherein said control valve assembly is adapted to control a supply of hydraulic fluid under pressure and said first piston is slidable on said sleeve, hydraulic fluid in said power chamber acting on the area of said first piston outside said sleeve.

7. A power-operated master cylinder assembly as in claim 2 comprising means for connecting the control valve assembly to a second brake circuit and to said power chamber.

8. A master cylinder assembly as in claim 1, wherein said closure member comprises a radial flange integral with said sleeve and said second seal means is an annular seal carried by the periphery of the flange to seal said flange to said cylinder bore.

9. A power-assisted master cylinder assembly as in claim 1, wherein said first seal means is located at the outer end of said piston outer portion.

10. A master cylinder assembly as in claim 9, wherein said first seal means comprises a single annular seal member which sealingly engages with said outer end of said piston outer portion, with said sleeve, and with said cylinder bore.

11. A master cylinder assembly as in claim 10, wherein said outer end of said piston outer portion and said seal member are provided with complementarily shaped formations arranged to retain said seal member to said outer end of said piston outer portion.

12. A master cylinder assembly as in claim 11, wherein said first seal means comprises a single annular seal member which sealingly engages with said sleeve, with said cylinder bore, and with an abutment member in engagement with the outer end of said piston outer portion.

13. A power-assisted master cylinder assembly comprising a master cylinder which includes a body provided with a bore having inner and outer ends, a piston moveable in said bore and having inner and outer portion, said inner portion bounding a pressure space inward of said piston for connection to a brake circuit, the outer portion of said piston being formed with an inwardly extending axial bore, a fixed sleeve slideably received in said bore, a pedal operated member extending through said fixed sleeve to directly engage said piston, an annular closure member for closing the outer end of an annular space defined between said sleeve and said bore, first seal means between said piston outer portion, said sleeve and said bore, second seal means for sealing said closure member to said bore and said sleeve, said first and second seal means, said sleeve and said bore defining a sealed annular power chamber, and an inlet to said power chamber for connection to a fluid pressure source, said pedal-operated member and pressure fluid in said power chamber acting in parallel on said first piston to prevent kick-back on said pedal-operated member on a rapid increase in pressure in said power chamber.

14. A power-assisted master cylinder as in claim 13, wherein said closure member comprises a radial flange integral with said sleeve and said second seal means is an annular seal carried by the periphery of the flange to seal said flange to said cylinder bore.

15. A power-assisted master cylinder as in claim 13, wherein said first seal means is located at the outer end of said piston outer portion.

16. A power-assisted master cylinder as in claim 15, wherein said first seal means comprises a single annular seal member which sealingly engages with said outer end of said piston outer portion, with said sleeve, and with said cylinder bore.

17. A power-assisted master cylinder as in claim 16, wherein said outer end of said piston outer portion and said seal member are provided with complementary shaped formations arranged to retain said seal member to said outer end of said piston outer portion.

18. A power-assisted master cylinder as in claim 13, wherein said first seal means comprises a single annular seal member which sealingly engages with said sleeve, with said cylinder bore, and with an abutment member in engagement with the outer end of said piston outer portion.

* * * * *